US008804971B1

(12) United States Patent
Williams et al.

(10) Patent No.: US 8,804,971 B1
(45) Date of Patent: Aug. 12, 2014

(54) HYBRID ENCODING OF HIGHER FREQUENCY AND DOWNMIXED LOW FREQUENCY CONTENT OF MULTICHANNEL AUDIO

(71) Applicants: Dolby Laboratories Licensing Corporation, San Francisco, CA (US); Dolby International AB, Amsterdam Zuidoost (NL)

(72) Inventors: Phillip A. Williams, Alameda, CA (US); Michael Schug, Erlangen (DE); Robin Thesing, Nuremberg (DE)

(73) Assignees: Dolby International AB, Amsterdam Zuidoost (NL); Dolby Laboratories Licensing Corporation, San Francisco, CA (US)

( * ) Notice: Subject to any disclaimer, the term of this patent is extended or adjusted under 35 U.S.C. 154(b) by 5 days.

(21) Appl. No.: 14/010,826

(22) Filed: Aug. 27, 2013

Related U.S. Application Data

(63) Continuation of application No. 13/946,287, filed on Jul. 19, 2013.

(60) Provisional application No. 61/817,729, filed on Apr. 30, 2013.

(51) Int. Cl.
*H04R 5/00* (2006.01)

(52) U.S. Cl.
CPC .................................... *G01L 19/008* (2013.01)
USPC ................... 381/23; 381/17; 381/18; 381/19; 381/20; 381/21; 381/22; 704/500; 704/503

(58) Field of Classification Search
USPC ........ 381/17, 18, 19, 20, 21, 22, 23; 704/500, 704/503; 700/94
See application file for complete search history.

(56) References Cited

U.S. PATENT DOCUMENTS

| | | | |
|---|---|---|---|
| 5,583,962 | A | 12/1996 | Todd et al. |
| 5,632,005 | A | 5/1997 | Davis |
| 5,633,981 | A | 5/1997 | Davis |
| 5,727,119 | A | 3/1998 | Davidson |
| 6,021,386 | A | 2/2000 | Todd et al. |
| 6,356,639 | B1 | 3/2002 | Ishito |

(Continued)

FOREIGN PATENT DOCUMENTS

| | | |
|---|---|---|
| WO | 03/083834 | 10/2003 |
| WO | 2004/102532 | 11/2004 |

OTHER PUBLICATIONS

Digital Audio Compression Standard (AC-3, E-AC-3) Specification (ATSC A/52:2010), Nov. 22, 2010.

(Continued)

*Primary Examiner* — Paul Kim
(74) *Attorney, Agent, or Firm* — Girard & Equitz LLP

(57) ABSTRACT

A method for encoding a multichannel audio input signal, including steps of generating a downmix of low frequency components of a subset of channels of the input signal, waveform coding each channel of the downmix, thereby generating waveform coded, downmixed data, performing parametric encoding on at least some higher frequency components of each channel of the input signal, thereby generating parametrically coded data, and generating an encoded audio signal (e.g., an E-AC-3 encoded signal) indicative of the waveform coded, downmixed data and the parametrically coded data. Other aspects are methods for decoding such an encoded signal, and systems configured to perform any embodiment of the inventive method.

30 Claims, 3 Drawing Sheets

(56) References Cited

U.S. PATENT DOCUMENTS

| | | | |
|---|---|---|---|
| 6,680,972 B1 | 1/2004 | Liljeryd | |
| 7,106,943 B2 | 9/2006 | Katayama | |
| 7,292,901 B2 | 11/2007 | Baumgarte | |
| 7,318,027 B2 | 1/2008 | Lennon | |
| 7,318,035 B2 | 1/2008 | Andersen | |
| 7,394,903 B2 | 7/2008 | Herre | |
| 7,450,727 B2 | 11/2008 | Griesinger | |
| 7,756,713 B2 | 7/2010 | Chong | |
| 7,761,304 B2 | 7/2010 | Faller | |
| 7,831,434 B2 | 11/2010 | Mehrotra | |
| 8,015,368 B2 | 9/2011 | Sharma | |
| 8,155,954 B2 | 4/2012 | Edler | |
| 8,214,223 B2 | 7/2012 | Thesing | |
| 8,325,929 B2 | 12/2012 | Koppens | |
| 2011/0274280 A1 | 11/2011 | Brown | |
| 2012/0275607 A1 * | 11/2012 | Kjoerling et al. | 381/22 |

OTHER PUBLICATIONS

Fielder, L.D. et al., "Introduction to Dolby Digital Plus, an Enhancement to the Dolby Digital Coding System," AES Convention Paper 6196, 117th AES Convention, Oct. 28, 2004.

* cited by examiner

HYBRID ENCODING OF HIGHER FREQUENCY AND DOWNMIXED LOW FREQUENCY CONTENT OF MULTICHANNEL AUDIO

CROSS-REFERENCE TO RELATED APPLICATION

The present application is a continuation of U.S. patent application Ser. No. 13/946,287, entitled "Hybrid Encoding of Higher Frequency and Downmixed Low Frequency Content of Multichannel Audio," filed on Jul. 19, 2013, and naming Philip A. Williams, Michael Schug, and Robin Thesing as inventors.

BACKGROUND OF THE INVENTION

1. Field of the Invention

The invention pertains to audio signal processing, and more particularly to multichannel audio encoding (e.g., encoding of data indicative of a multichannel audio signal) and decoding. In typical embodiments, a downmix of low frequency components of individual channels of multichannel input audio undergo waveform coding and the other (higher frequency) frequency components of the input audio undergo parametric coding. Some embodiments encode multichannel audio data in accordance with one of the formats known as AC-3 and E-AC-3 (Enhanced AC-3), or in accordance with another encoding format.

2. Background of the Invention

Dolby Laboratories provides proprietary implementations of AC-3 and E-AC-3 known as Dolby Digital and Dolby Digital Plus, respectively. Dolby, Dolby Digital, and Dolby Digital Plus are trademarks of Dolby Laboratories Licensing Corporation.

Although the invention is not limited to use in encoding audio data in accordance with the E-AC-3 (or AC-3) format, for convenience it will be described in embodiments in which it encodes an audio bitstream in accordance with the E-AC-3 format.

An AC-3 or E-AC-3 encoded bitstream comprises metadata and can comprise one to six channels of audio content. The audio content is audio data that has been compressed using perceptual audio coding. Details of AC-3 coding are well known and are set forth in many published references including the following:

*ATSC Standard A52/A: Digital Audio Compression Standard* (*AC*-3), *Revision A*, Advanced Television Systems Committee, 20 Aug. 2001; and U.S. Pat. Nos. 5,583,962; 5,632,005; 5,633,981; 5,727,119; and 6,021,386.

Details of Dolby Digital Plus (E-AC-3) coding are set forth in, for example, "Introduction to Dolby Digital Plus, an Enhancement to the Dolby Digital Coding System," AES Convention Paper 6196, 117$^{th}$ AES Convention, Oct. 28, 2004.

Each frame of an AC-3 encoded audio bitstream contains audio content and metadata for 1536 samples of digital audio. For a sampling rate of 48 kHz, this represents 32 milliseconds of digital audio or a rate of 31.25 frames per second of audio.

Each frame of an E-AC-3 encoded audio bitstream contains audio content and metadata for 256, 512, 768 or 1536 samples of digital audio, depending on whether the frame contains one, two, three or six blocks of audio data respectively.

The audio content encoding performed by typical implementations of E-AC-3 encoding includes waveform encoding and parametric encoding.

Waveform encoding of an audio input signal (typically performed to compress the signal so that the encoded signal comprises fewer bits than the input signal) encodes the input signal in a manner which preserves the input signal's waveform as much as possible subject to applicable constraints (e.g., so that the waveform of the encoded signal matches that of the input signal to the extent possible). For example, in conventional E-AC-3 encoding, waveform encoding is performed on the low frequency components (typically, up to 3.5 kHz or 4.6 kHz) of each channel of a multichannel input signal to compress such low frequency content of the input signal, by generating (in the frequency domain) a quantized representation (quantized mantissa and exponent) of each sample (which is a frequency component) of each low frequency band of each channel of the input signal.

More specifically, typical implementations of E-AC-3 encoders (and some other conventional audio encoders) implement a psychoacoustic model to analyze frequency domain data indicative of the input signal on a banded basis (i.e., typically 50 nonuniform bands approximating the frequency bands of the well-known psychoacoustic scale known as the Bark scale) to determine an optimal allocation of bits to each mantissa. To perform waveform encoding on the low frequency components of the input signal, the mantissa data (indicative of the low frequency content) are quantized to a number of bits corresponding to the determined bit allocation. The quantized mantissa data (and corresponding exponent data and typically also corresponding metadata) are then formatted into an encoded output bitstream.

Parametric encoding, another well-known type of audio signal encoding, extracts and encodes feature parameters of the input audio signal, such that the reconstructed signal (after encoding and subsequent decoding) has as much intelligibility as possible (subject to applicable constraints), but such that the waveform of the encoded signal may by very different from that of the input signal.

For example, PCT International Application Publication No. WO 03/083834 A1, published Oct. 9, 2003 and PCT International Application Publication No. WO 2004/102532 A1, published Nov. 25, 2004, describe a type of parametric coding known as spectral extension coding. In spectral extension coding, the frequency components of a full frequency range audio input signal are encoded as a sequence of frequency components of a limited frequency range signal (a baseband signal) and a corresponding sequence of encoding parameters (indicative of a residual signal) which determine (with the baseband signal) an approximated version of the full frequency range input signal.

Another well known type of parametric encoding is channel coupling coding. In channel coupling coding, a monophonic downmix of the channels of an audio input signal is constructed. The input signal is encoded as this downmix (a sequence of frequency components) and a corresponding sequence of coupling parameters. The coupling parameters are level parameters which determine (with the downmix) an approximated version of each of the channels of the input signal. The coupling parameters are frequency-banded metadata that match the energy of the monophonic downmix to the energy of each channel of the input signal.

For example, conventional E-AC-3 encoding of a 5.1 channel input signal (with an available bitrate of 192 kbps for delivery of the encoded signal) typically implements channel coupling coding to encode the intermediate frequency components (in the range $F1<f\leq F2$, where F1 is typically equal to 3.5 kHz or 4.6 kHz, and F2 is typically equal to 10 kHz or 10.2 kHz) of each channel of the input signal, and spectral extension coding to encode the high frequency components (in the range F2<f≤F3, where F2 is typically equal to 10 kHz or 10.2 kHz, and F3 is typically equal to 14.8 kHz or 16 kHz) of each channel of the input signal. The monophonic downmix determined during performance of the channel coupling encoding is waveform coded, and the waveform coded downmix is delivered (in the encoded output signal) along with the coupling parameters. The downmix determined during performance of the channel coupling encoding is employed as the baseband signal for the spectral extension coding. The spectral extension coding determines (from the baseband signal and the high frequency components of each channel of the input signal) another set of encoding parameters (SPX parameters). The SPX parameters are included in and delivered with the encoded output signal.

In another type of parametric coding sometimes referred to as spatial audio coding, a downmix (e.g., a mono or stereo downmix) of the channels of a multichannel audio input signal is generated. The input signal is encoded as an output signal including this downmix (a sequence of frequency components) and a corresponding sequence of spatial parameters (or as a waveform coded version of each channel of the downmix, with a corresponding sequence of spatial parameters). The spatial parameters allow for restoration of both the amplitude envelope of each channel of the audio input signal and the interchannel correlations between the channels of the audio input signal from the downmix of the input signal. This type of parametric coding may be performed on all frequency components of the input signal (i.e., over the full frequency range of the input signal) rather than on just the frequency components in a subrange of the input signal's full frequency range (i.e., so that the encoded version of the input signal includes the downmix and spatial parameters for all frequencies of the input signal's full frequency range, rather than just a subset thereof).

In E-AC-3 or AC-3 encoding of an audio bitstream, blocks of input audio samples to be encoded undergo time-to-frequency domain transformation resulting in blocks of frequency domain data, commonly referred to as transform coefficients (or frequency coefficients or frequency components) located in uniformly spaced frequency bins. The frequency coefficient in each bin is then converted (e.g., in BFPE stage 7 of the FIG. 1 system) into a floating point format comprising an exponent and a mantissa.

Typically, the mantissa bit assignment is based on the difference between a fine-grain signal spectrum (represented by a power spectral density ("PSD") value for each frequency bin) and a coarse-grain masking curve (represented by a mask value for each frequency band).

FIG. 1 is an encoder configured to perform conventional E-AC-3 encoding on time-domain input audio data 1. Analysis filter bank 2 of the encoder converts the time-domain input audio data 1 into frequency-domain audio data 3, and block floating point encoding (BFPE) stage 7 generates a floating point representation of each frequency component of data 3, comprising an exponent and mantissa for each frequency bin. The frequency-domain data output from stage 7 will sometimes also be referred to herein as frequency domain audio data 3. The frequency domain audio data output from stage 7 are then encoded, including by performing waveform coding (in elements 4, 6, 10, and 11 of the FIG. 1 system) on the low frequency components (having frequency less than or equal to "F1", where F1 is typically equal to 3.5 kHz or 4.6 kHz) of the frequency domain data output from stage 7, and by performing parametric coding (in parametric encoding stage 12) on the other frequency components (those having frequency greater than F1) of the frequency domain data output from stage 7.

The waveform encoding includes quantization of the mantissas (of the low frequency components output from stage 7) in quantizer 6 and tenting of the exponents (of the low frequency components output from stage 7) in tenting stage 10 and encoding (in exponent coding stage 11) of the tented exponents generated in stage 10. Formatter 8 generates an E-AC-3 encoded bitstream 9 in response to the quantized data output from quantizer 6, the coded differential exponent data output from stage 11, and the parametrically encoded data output from stage 12.

Quantizer 6 performs bit allocation and quantization based upon control data (including masking data) generated by controller 4. The masking data (determining a masking curve) is generated from the frequency domain data 3, on the basis of a psychoacoustic model (implemented by controller 4) of human hearing and aural perception. The psychoacoustic modeling takes into account the frequency-dependent thresholds of human hearing, and a psychoacoustic phenomenon referred to as masking, whereby a strong frequency component close to one or more weaker frequency components tends to mask the weaker components, rendering them inaudible to a human listener. This makes it possible to omit the weaker frequency components when encoding audio data, and thereby achieve a higher degree of compression, without adversely affecting the perceived quality of the encoded audio data (bitstream 9). The masking data comprises a masking curve value for each frequency band of the frequency domain audio data 3. These masking curve values represent the level of signal masked by the human ear in each frequency band. Quantizer 6 uses this information to decide how best to use the available number of data bits to represent the frequency domain data of each frequency band of the input audio signal.

It is known that in conventional E-AC-3 encoding, differential exponents (i.e., the difference between consecutive exponents) are coded instead of absolute exponents. The differential exponents can only take on one of five values: 2, 1, 0, −1, and −2. If a differential exponent outside this range is found, one of the exponents being subtracted is modified so that the differential exponent (after the modification) is within the noted range (this conventional method is known as "exponent tenting" or "tenting"). Tenting stage 10 of the FIG. 1 encoder generates tented exponents in response to the raw exponents asserted thereto, by performing such a tenting operation.

In a typical embodiment of E-AC-3 coding, a 5 or 5.1 channel audio signal is encoded at a bit rate in the range from about 96 kbps to about 192 kbps. Currently, at 192 kbps a typical E-AC-3 encoder encodes a 5-channel (or 5.1 channel) input signal using a combination of discrete waveform coding for the lower frequency components (e.g., up to 3.5 kHz or 4.6 kHz) of each channel of the signal, channel coupling for the intermediate frequency components (e.g., from 3.5 kHz to about 10 kHz or from 4.6 kHz to about 10 kHz) of each channel of the signal, and spectral extension for the higher frequency components (e.g., from about 10 kHz to 16 kHz or from about 10 kHz to 14.8 kHz) of each channel of the signal. While this yields acceptable quality, as the maximum bitrate available for delivering the encoded output signal is reduced below 192 kbps, the quality (of a decoded version of the encoded output signal) degrades rapidly. For example, when using E-AC-3 to encode 5.1 channel audio for streaming, temporary data bandwidth limitations may require a data rate lower than 192 kbps (e.g., to 64 kbps). However, using E-AC-3 to encode a 5.1 channel signal for delivery at a bitrate below 192 kbps does not produce "broadcast quality" encoded audio. In order to code a signal (using E-AC-3 encoding) for delivery at a bitrate substantially below 192 kbps (e.g., 96 kbps, or 128 kbps, or 160 kbps), the best available tradeoff between audio bandwidth (available for delivering the encoded audio signal), coding artifacts, and spatial collapse must be found. More generally, the inventors have recognized that the best tradeoff between audio bandwidth, coding artifacts, and spatial collapse must be found to otherwise encode multichannel input audio for delivery at low (or less than typical) bitrates.

One naive solution is to downmix the multichannel input audio to the number of channels that can be produced at adequate quality (e.g., "broadcast quality" if this is the minimum adequate quality) for the available bitrate, and then perform conventional encoding of each channel of the downmix. For example, one might downmix a five-channel input signal to a three-channel downmix (where the available bitrate is 128 kbps) or to a two-channel downmix (where the available bitrate is 96 kbps). However, this solution maintains coding quality and audio bandwidth at the expense of severe spatial collapse.

Another naive solution is to avoid downmixing (e.g., to produce a full 5.1 channel encoded output signal in response to a 5.1 channel input signal), and instead push the codec to its limit. However, this solution would introduce more coding artifacts and sacrifice audio bandwidth, although it would maintain as much spaciousness as possible.

BRIEF DESCRIPTION OF THE INVENTION

In typical embodiments, the invention is a method for hybrid encoding of a multichannel audio input signal (e.g., an encoding method compliant with the E-AC-3 standard). The method includes steps of generating a downmix of low frequency components (e.g., having frequency up to a maximum value in the range from about 1.2 kHz to about 4.6 kHz, or from about 3.5 kHz to about 4.6 kHz) of individual channels of the input signal, performing waveform coding on each channel of the downmix, and performing parametric encoding of the other frequency components (at least some intermediate frequency and/or high frequency components) of each channel of the input signal (without performing preliminary downmixing of the other frequency components of any of input signal's channels).

In typical embodiments, the inventive encoding method compresses the input signal so that the encoded output signal comprises fewer bits than the input signal, and so that the encoded signal can be transmitted with good quality at a low bitrate (e.g., in the range from about 96 kbps to about 160 kbps for an E-AC-3 compliant embodiment, where "kbps" denotes kilobits per second). In this context, the transmission bitrate is "low" in the sense that it is substantially less than that typically available for transmission of conventionally encoded audio (e.g., the typical bit rate of 192 kbps for conventionally E-AC-3 encoded audio), but greater than the minimum bitrate below which fully parametric coding of the input signal would be required to achieve adequate quality (of a decoded version of the transmitted encoded signal). In order to provide adequate quality (of a decoded version of the encoded signal after transmission of the encoded signal, e.g., at a low bitrate), the multichannel input signal is encoded as a combination of a waveform coded downmix of low frequency content of the original channels of the input signal, and a parametrically coded version of the high (higher then low) frequency content of each original channel of the input signal.

Significant bitrate savings are achieved by waveform coding a downmix of the low frequency content as opposed to discrete waveform coding of the low frequency content of each original input channel. Because the amount of data required (to be included in the encoded signal) to parametrically code the high frequencies of each input channel is relatively small, it is possible to parametrically code the higher frequencies of each input channel without significantly increasing the bitrate at which the encoded signal can be delivered, resulting in improved spatial imaging at relatively low "bit rate" cost. Typical embodiments of the inventive hybrid (waveform and parametric) coding method allow for more control over the balance between artifacts resulting from spatial image collapse (due to downmixing) and coding noise, and generally result in an overall improvement in perceived quality (of a decoded version of the encoded signal) relative to that which can be achieved by conventional methods.

In some embodiments, the invention is an E-AC-3 encoding method or system which generates encoded audio specifically for delivery as streaming content in extremely bandwidth-limited environments. In other embodiments, the inventive encoding method and system generates encoded audio for delivery at higher bitrates for more general applications.

In a class of embodiments, the downmixing of only the low frequency bands of each channel of the multi-channel input audio (followed by waveform coding of the resulting downmix of low frequency components) saves a large number of bits (i.e., reduces the number of bits of the encoded output signal) by eliminating the need for including (in the encoded output signal) waveform coded bits for the low frequency bands of the audio content, and also minimizes (or reduces) spatial collapse during rendering of a decoded version of the delivered encoded signal) as a result of inclusion (in the encoded signal) of parametrically coded content (e.g., channel coupled and spectrally extended content) of all channels of the original input audio. The encoded signal generated by such embodiments has a more balanced tradeoff of spatial, bandwidth, and coding artifacts than it would if it had been generated by a conventional encoding method (e.g., one of the above-mentioned naïve encoding methods).

In a some embodiments, the invention is a method for encoding a multichannel audio input signal, including the steps of: generating a downmix of low frequency components of at least some channels of the input signal; waveform coding each channel of the downmix, thereby generating waveform coded, downmixed data indicative of audio content of the downmix; performing parametric encoding on at least some higher frequency components (e.g., intermediate frequency components and/or high frequency components) of each channel of the input signal (e.g., performing channel coupling coding of the intermediate frequency components and spectral extension coding of the high frequency components), thereby generating parametrically coded data indicative of said at least some higher frequency components of said each channel of the input signal; and generating an encoded audio signal indicative of the waveform coded, downmixed data and the parametrically coded data. In some such embodiments, the encoded audio signal is an E-AC-3 encoded audio signal.

Another aspect of the invention is a method for decoding encoded audio data, including the steps of receiving a signal indicative of encoded audio data, where the encoded audio data have been generated by encoding audio data in accordance with any embodiment of the inventive encoding method, and decoding the encoded audio data to generate a signal indicative of the audio data.

For example, in some embodiments the invention is a method for decoding an encoded audio signal indicative of waveform coded data and parametrically coded data, where the encoded audio signal has been generated by generating a downmix of low frequency components of at least some channels of a multichannel audio input signal, waveform coding each channel of the downmix, thereby generating the waveform coded data such that said waveform coded data are indicative of audio content of the downmix, performing parametric encoding on at least some higher frequency components of each channel of the input signal, thereby generating the parametrically coded data such that said parametrically coded data are indicative of said at least some higher frequency components of said each channel of the input signal, and generating the encoded audio signal in response to the waveform coded data and the parametrically coded data. The decoding method includes steps of: extracting the waveform encoded data and the parametrically encoded data from the encoded audio signal; performing waveform decoding on the extracted waveform encoded data to generate a first set of recovered frequency components indicative of low frequency audio content of each channel of the downmix; and performing parametric decoding on the extracted parametrically encoded data to generate a second set of recovered frequency components indicative of higher frequency (e.g., intermediate frequency and high frequency) audio content of each channel of the multichannel audio input signal. In some such embodiments, the multichannel audio input signal has N channels, where N is an integer, and the decoding method also includes a step of generating N channels of decoded frequency-domain data including by combining said first set of recovered frequency components and said second set of recovered frequency components, such that each channel of the decoded frequency-domain data is indicative of intermediate frequency and high frequency audio content of a different one of the channels of the multichannel audio input signal, and each of at least a subset of the channels of the decoded frequency-domain data is indicative of low frequency audio content of the multichannel audio input signal.

Another aspect of the invention is a system including an encoder configured (e.g., programmed) to perform any embodiment of the inventive encoding method to generate encoded audio data in response to audio data, and a decoder configured to decode the encoded audio data to recover the audio data.

Other aspects of the invention include a system or device (e.g., an encoder, a decoder, or a processor) configured (e.g., programmed) to perform any embodiment of the inventive method, and a computer readable medium (e.g., a disc) which stores code for implementing any embodiment of the inventive method or steps thereof. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and processing circuitry programmed (and/or otherwise configured) to perform an embodiment of the inventive method (or steps thereof) in response to data asserted thereto.

DETAILED DESCRIPTION OF EMBODIMENTS OF THE INVENTION

Figure 2:
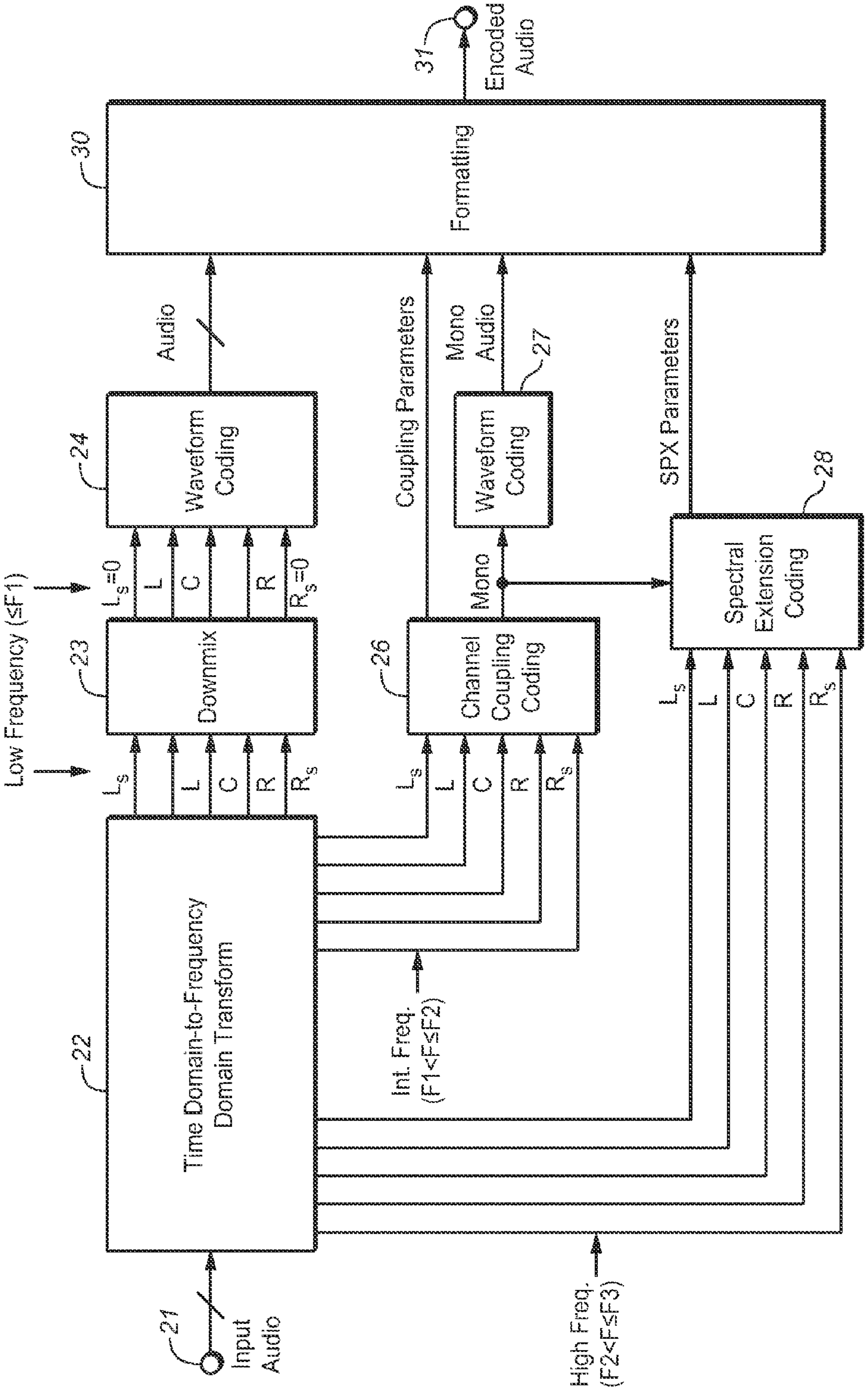
FIG. 2 is a block diagram of an encoding system configured to perform an embodiment of the inventive encoding method.

An embodiment of the inventive coding method and a system configured to implement the method will be described with reference to FIG. 2. The system of FIG. 2 is an E-AC-3 encoder which is configured to generate an E-AC-3 encoded audio bitstream (31) in response to a multi-channel audio input signal (21). Signal 21 may be a “5.0 channel” time-domain signal comprising five full range channels of audio content.

The FIG. 2 system is also configured to generate E-AC-3 encoded audio bitstream 31 in response to a 5.1 channel audio input signal 21 comprising five full range channels and one low frequency effects (LFE) channel. The elements shown in FIG. 2 are capable of encoding the five full range input channels, and providing bits indicative of the encoded full range channels to formatting stage 30 for inclusion in the output bitstream 31. Conventional elements of the system for encoding the LFE channel (in a conventional manner) and providing bits indicative of the encoded LFE channel to formatting stage 30 for inclusion in the output bitstream 31 are not shown in FIG. 2.

Time domain-to-frequency domain transform stage 22 of FIG. 2 is configured to convert each channel of time-domain input signal 21 into a channel of frequency domain audio data. Because the system of FIG. 2 is an E-AC-3 encoder, the frequency components of each channel are frequency-banded into 50 nonuniform bands approximating the frequency bands of the well-known psychoacoustic scale known as the Bark scale. In variations on the FIG. 2 embodiment (e.g., in which encoded output audio 31 does not have E-AC-3 compliant format), the frequency components of each channel of the input signal are frequency-banded in another manner (i.e., on the basis of any set of uniform or non-uniform frequency bands).

The low frequency components of all or some of the channels output from stage 22 undergo downmixing in downmix stage 23. The low frequency components have frequencies less than or equal to a maximum frequency “F1”, where F1 is typically in a range from about 1.2 kHz to about 4.6 kHz).

The intermediate frequency components of all channels output from stage 22 undergo channel coupling coding in stage 26. The intermediate frequency components have frequencies, f, in the range $F1 \leq f \leq F2$, where F1 is typically in a range from about 1.2 kHz to about 4.6 kHz, and F2 is typically in the range from about 8 kHz to about 12.5 kHz (e.g., F2 is equal to 8 kHz or 10 kHz or 10.2 kHz).

The high frequency components of all channels output from stage 22 undergo spectral extension coding in stage 28. The high frequency components have frequencies, f, in the range $F2 < f \leq F3$, where F2 is typically in the range from about 8 kHz to about 12.5 kHz, and F3 is typically in a range from about 10.2 kHz to about 18 kHz).

The inventors have determined that waveform coding a downmix (e.g., a three-channel downmix of an input signal having five full range channels) of the low frequency components of the audio content of some or all channels of a multi-channel input signal (rather than discretely waveform coding the low frequency components of the audio content of all five of the full range input channels) and parametrically encoding the other frequency components of each channel of the input signal, results in an encoded output signal having improved quality relative to that obtained using standard E-AC-3 coding at the reduced bit rate and avoids objectionable spatial collapse. The FIG. 2 system is configured to perform such an embodiment of the inventive encoding method. For example, the FIG. 2 system can perform such an embodiment of the inventive method to generate encoded output signal 31 with improved quality (and in a manner avoiding objectionable spatial collapse) in the case that multi-channel input signal 21 has five full range channels (i.e., is a 5 or 5.1 channel audio signal) and is encoded at a reduced bit rate (e.g., 160 kbps, or another bit rate greater than about 96 kbps and substantially less than 192 kbps, where "kbps" denotes kilobits per second), where "reduced" bit rate indicates that the bit rate is below the bit rate at which a standard E-AC-3 encoder typically operates during encoding of the same input signal. While both the noted embodiment of the inventive method and the conventional E-AC-3 encoding method encode the intermediate and higher frequency components of the input signal's audio content using parametric techniques (i.e., channel coupling coding, as performed in stage 26 of the FIG. 2 system, and spectral extension coding, as performed in stage 28 of the FIG. 2 system), the inventive method performs waveform coding of the low frequency components of the content of only a reduced number of (e.g., three) downmix channels rather than all five discrete channels of the input audio signal. This results in a beneficial trade-off whereby coding noise in the downmix channels is reduced (e.g., because waveform coding is performed on low frequency components of less than five rather than five channels) at the expense of a loss of spatial information (because the low frequency data from some of the channels, typically the surround channels, are mixed into other channels, typically the front channels). The inventors have determined that this trade-off typically results in a better quality output signal (which provides better sound quality after delivery, decoding and rendering of the encoded output signal) than that produced by performing standard E-AC-3 coding on the input signal at the reduced bit rate.

In a typical embodiment, downmix stage 23 of the FIG. 2 system replaces the low frequency components of each channel of a first subset of the channels of the input signal (typically, the right and left surround channels, Ls and Rs) with zero values, and passes through unchanged (to waveform encoding stage 24) the low frequency components of the other channels of the input signal (e.g., the left front channel, L, center channel, C, and right front channel, R, as shown in FIG. 2) as the downmix of the low frequency components of the input channels. Alternatively, downmix of low frequency content is generated in another way. For example, in one alternative implementation, the operation of generating the downmix includes a step of mixing low frequency components of at least one channel of the first subset with low frequency components of at least one of the other channels of the input signal (e.g., stage 23 could be implemented to mix the right surround channel, Rs, and right front channel, R, asserted thereto to produce the right channel of the downmix, and to mix the left surround channel, Ls, and left front channel, L, asserted thereto to produce the left channel of the downmix).

Each channel of the downmix generated in stage 23 undergoes waveform coding (in a conventional manner) in waveform encoding stage 24. In a typical implementation in which downmix stage 23 replaces the low frequency components of each channel of a first subset of the channels of the input signal (e.g., the right and left surround channels, Ls and Rs, as indicated in FIG. 2) with a low frequency component channel comprising zero values, and each such channel comprising zero values (sometimes referred to herein as a "silent" channel) is output from stage 23 together with each non-zero (non-silent) channel of the downmix. When each non-zero channel of the downmix (generated in stage 23) undergoes waveform coding in stage 24, each "silent" channel asserted from stage 23 to stage 24 is typically also waveform coded (at a very low processing and bit cost). All the waveform encoded channels generated in stage 24 (including any waveform encoded silent channels) are output from stage 24 to formatting stage 30 for inclusion in the appropriate format in the encoded output signal 31.

In typical embodiments, when the encoded output signal 31 is delivered (e.g., transmitted) to a decoder (e.g., the decoder to be described with reference to FIG. 3), the decoder sees the full number of waveform coded channels (e.g., five waveform coded channels) of low frequency audio content, but a subset of them (e.g., two of them in the case of a three-channel downmix, or three of them in the case of a two-channel downmix) are "silent" channels consisting entirely of zeros.

In order to generate the downmix of the low frequency content, different embodiments of the invention (e.g., different implementations of stage 23 of FIG. 2) employ different methods. In some embodiments in which the input signal has five full range channels (left front, left surround, right front, right surround, and center) and a 3-channel downmix is generated, the low frequency components of the left surround channel signal of the input signal are mixed into low frequency components of the left front channel of the input signal to generate the left front channel of the downmix, and the low frequency components of the right surround signal of the input signal are mixed into the low frequency components of the right front channel of the input signal to generate the right front channel of the downmix. The center channel of the input signal is unchanged (i.e. does not undergo mixing) prior to waveform and parametric coding, and the low frequency components of the left and right surround channels of the downmix are set to zeros.

Alternatively, if a 2-channel downmix is generated (i.e., for even lower bitrates), in addition to mixing low frequency components of the left surround channel of the input signal with low frequency components of the left front channel of the input signal, the low frequency components of the center channel of the input signal are also mixed with the low frequency components of the left front channel of the input signal, and the low frequency components of the right surround channel and the center channel of the input signal are mixed with the low frequency components of the right front channel of the input signal, typically after reducing the level of the low frequency components of the input signal's center channel by 3 dB (to account for splitting the power of the center channel between the left and right channels).

In other alternative embodiments, a monophonic (one-channel) downmix is generated, or a downmix is generated which has some number of channels (e.g., four) other than two or three channels.

With reference again to FIG. 2, the intermediate frequency components of all channels output from stage 22 (i.e., all five channels of intermediate frequency components produced in response to an input signal 21 having five full range channels) undergo conventional channel coupling coding in channel coupling coding stage 26. The output of stage 26, a monophonic downmix of the intermediate frequency components (labeled "mono audio" in FIG. 2) and a corresponding sequence of coupling parameters.

The monophonic downmix is waveform coded (in a conventional manner) in waveform coding stage 27, and the waveform coded downmix output from stage 27, and the corresponding sequence of coupling parameters output from stage 26, are asserted to formatting stage 30 for inclusion in the appropriate format in the encoded output signal 31.

The monophonic downmix generated by stage 26 as a result of the channel coupling encoding is also asserted to spectral extension coding stage 28. This monophonic downmix is employed by stage 28 as the baseband signal for spectral extension coding of the high frequency components of all channels output from stage 22. Stage 28 is configured to perform spectral extension coding of the high frequency components of all channels output from stage 22 (i.e., all five channels of high frequency components produced in response to an input signal 21 having five full range channels), using the monophonic downmix from stage 26. The spectral extension coding includes determination of a set of encoding parameters (SPX parameters) corresponding to the high frequency components.

The SPX parameters can be processed by a decoder (e.g., the decoder of FIG. 3) with the baseband signal (output from stage 26), to reconstruct a good approximation of the high frequency components of the audio content of each of the channels of input signal 21. The SPX parameters are asserted from coding stage 28 to formatting stage 30 for inclusion in the appropriate format in the encoded output signal 31.

Figure 3:
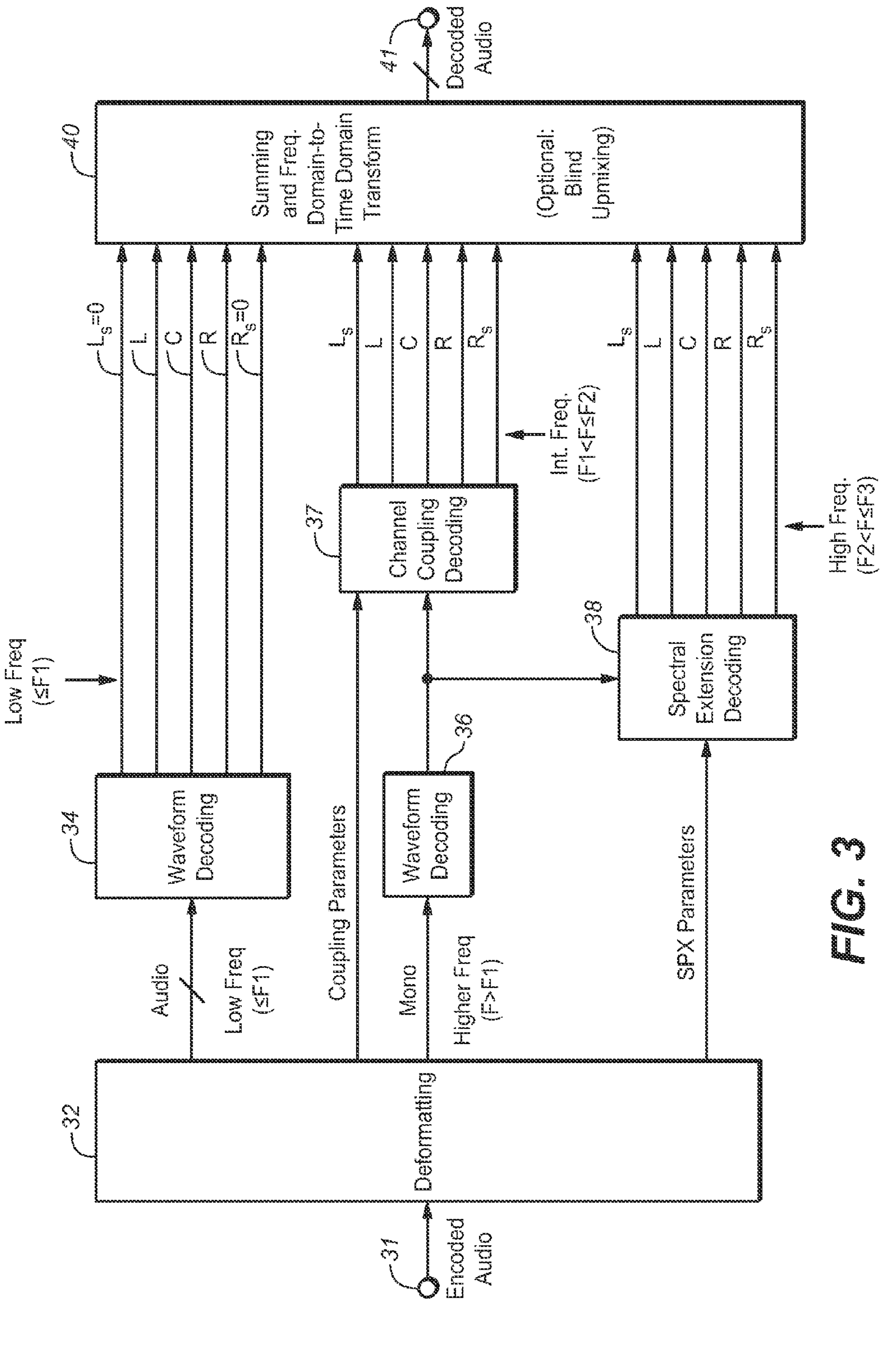
FIG. 3 is a block diagram of a decoding system configured to perform an embodiment of the inventive decoding method.

Next, with reference to FIG. 3 we describe an embodiment of the inventive method and system for decoding the encoded output signal 31 generated by the FIG. 2 encoder.

The system of FIG. 3 is an E-AC-3 decoder which implements an embodiment of the inventive decoding system and method, and is configured to recover a multi-channel audio output signal 41 in response to an E-AC-3 encoded audio bitstream (e.g., E-AC-3 encoded signal 31 generated by the FIG. 2 encoder, and then transmitted or otherwise delivered to the FIG. 3 decoder). Signal 41 may be a 5.0 channel time-domain signal comprising five full range channels of audio content, where signal 31 is indicative of audio content of such a 5.0 channel signal.

Alternatively, signal 41 may be a 5.1 channel time domain audio signal comprising five full range channels and one low frequency effects (LFE) channel, if signal 31 is indicative of audio content of such a 5.1 channel signal. The elements shown in FIG. 3 are capable of decoding the five full range channels indicated by such a signal 31 (and providing bits indicative of the decoded full range channels to stage 40 for use in generation of output signal 41). For decoding a signal 31 indicative of audio content of a 5.1 channel signal, the system of FIG. 3 would include conventional elements (not shown in FIG. 3) for decoding the LFE channel of such 5.1 channel signal (in a conventional manner) and providing bits indicative of the decoded LFE channel to stage 40 for use in generation of output signal 41.

Deformatting stage 32 of the FIG. 3 decoder is configured to extract from signal 31 the waveform encoded low frequency components (generated by stage 24 of the FIG. 2 encoder) of a downmix of low frequency components of all or some of the original channels of signal 21, the waveform encoded monophonic downmix of intermediate frequency components of signal 21 (generated by stage 27 of the FIG. 2 encoder), the sequence of coupling parameters generated by channel coupling coding stage 26 of the FIG. 2 encoder, and the sequence of SPX parameters generated by spectral extension coding stage 28 of the FIG. 2 encoder.

Stage 32 is coupled and configured to assert to waveform decoding stage 34 each extracted downmix channel of waveform encoded low frequency components. Stage 34 is configured to perform waveform decoding on each such downmix channel of waveform encoded low frequency components, to recover each downmix channel of low frequency components which was output from downmix stage 23 of the FIG. 2 encoder. Typically, these recovered downmix channels of low frequency components include silent channels (e.g., the silent left surround channel, Ls=0, indicated in FIG. 3, and the silent right surround channel, Rs=0, indicated in FIG. 3) and each non-silent channel of low frequency components of the downmix generated by stage 23 of the FIG. 2 encoder (e.g., left front channel, L, center channel, C, and right front channel, R, indicated in FIG. 3). The low frequency components of each downmix channel output from stage 34 have frequencies less than or equal to "F1", where F1 is typically in the range from about 1.2 kHz) to about 4.6 kHz.

The recovered downmix channels of low frequency components are asserted from stage 34 to frequency domain combining and frequency domain-to-time domain transform stage 40.

In response to the waveform encoded monophonic downmix of intermediate frequency components extracted by stage 32, waveform decoding stage 36 of the FIG. 3 decoder is configured to perform waveform decoding thereon to recover the monophonic downmix of intermediate frequency components which was output from channel coupling encoding stage 26 of the FIG. 2 encoder. In response to the monophonic downmix of intermediate frequency components recovered by stage 36, and the sequence of coupling parameters extracted by stage 32, channel coupling decoding stage 37 of FIG. 3 is configured to perform channel coupling decoding to recover the intermediate frequency components of the original channels of signal 21 (which were asserted to the inputs of stage 26 of the FIG. 2 encoder). These intermediate frequency components have frequencies in the range $F1<f\leq F2$, where F1 is typically in the range from about 1.2 kHz to about 4.6 kHz, and F2 is typically in the range from about 8 kHz to about 12.5 kHz (e.g., F2 is equal to 8 kHz or 10 kHz or 10.2 kHz).

The recovered intermediate frequency components are asserted from stage 37 to frequency domain combining and frequency domain-to-time domain transform stage 40.

The monophonic downmix of intermediate frequency components generated by waveform decoding stage 36 is also asserted to spectral extension decoding stage 38. In response to the monophonic downmix of intermediate frequency components, and the sequence of SPX parameters extracted by stage 32, spectral extension decoding stage 38 is configured to perform spectral extension decoding to recover the high frequency components of the original channels of signal 21 (which were asserted to the inputs of stage 28 of the FIG. 2 encoder). These high frequency components have frequencies in the range $F2<f\leq F3$, where F2 is typically in a range from about 8 kHz to about 12.5 kHz, and F3 is typically in the range from about 10.2 kHz to about 18 kHz (e.g., from about 14.8 kHz to about 16 kHz).

The recovered high frequency components are asserted from stage 38 to frequency domain combining and frequency domain-to-time domain transform stage 40.

Stage 40 is configured to combine (e.g., sum together) the recovered intermediate frequency components, high frequency components, and low frequency components which correspond to the left front channel of the original multichannel signal 21, to generate a full frequency range, frequency domain recovered version of the left front channel.

Similarly, stage 40 is configured to combine (e.g., sum together) the recovered intermediate frequency components, high frequency components, and low frequency components which correspond to the right front channel of the original multi-channel signal 21, to generate a full frequency range, frequency domain recovered version of the right front channel, and to combine (e.g., sum together) the recovered intermediate frequency components, high frequency components, and low frequency components which correspond to the center of the original multi-channel signal 21, to generate a full frequency range, frequency domain recovered version of the center channel.

Stage 40 is also configured to combine (e.g., sum together) the recovered low frequency components of the left surround channel of the original multi-channel signal 21 (which have zero values, since the left surround channel of the low frequency component downmix is a silent channel) with the recovered intermediate frequency components and high frequency components which correspond to the left surround channel of the original multi-channel signal 21, to generate a frequency domain recovered version of the left surround front channel which has a full frequency range (although it lacks low frequency content due to the downmixing performed in stage 23 of the FIG. 2 encoder).

Stage 40 is also configured to combine (e.g., sum together) the recovered low frequency components of the right surround channel of the original multi-channel signal 21 (which have zero values, since the right surround channel of the low frequency component downmix is a silent channel) with the recovered intermediate frequency components and high frequency components which correspond to the right surround channel of the original multi-channel signal 21, to generate a frequency domain recovered version of the right surround front channel which has a full frequency range (although it lacks low frequency content due to the downmixing performed in stage 23 of the FIG. 2 encoder).

Stage 40 is also configured to perform a frequency domain-to-time domain transform on each recovered (frequency domain) full frequency range channel of frequency components, to generate each channel of decoded output signal 41. Signal 41 is a time-domain, multi-channel audio signal whose channels are recovered versions of the channels of original multi-channel signal 21.

More generally, typical embodiments of the inventive decoding method and system recover (from an encoded audio signal which has been generated in accordance with an embodiment of the invention) each channel of a waveform encoded downmix of low frequency components of the audio content of channels (some or all of the channels) of an original multi-channel input signal, and also recover each channel of parametrically encoded intermediate and high frequency components of the content of each channel of the multi-channel input signal. To perform the decoding, the recovered low frequency components of the downmix undergo waveform decoding and can then be combined with parametrically decoded versions of the recovered intermediate and high frequency components in any of several different ways. In a first class of embodiments, the low frequency components of each downmix channel are combined with the intermediate and high frequency components of a corresponding parametrically coded channel. For example, consider the case that the encoded signal includes a 3-channel downmix (Left Front, Center, and Right Front channels) of the low frequency components of a five-channel input signal, and that the encoder had output zero values (in connection with generating the low frequency component downmix) in place of the low frequency components of the left surround and right surround channels of the input signal. The left output of the decoder would be the waveform decoded left front downmix channel (comprising low frequency components) combined with the parametrically decoded left channel signal (comprising intermediate and high frequency components). The center channel output from the decoder would be the waveform decoded center downmix channel combined with the parametrically decoded center channel. The right output of the decoder would be the waveform decoded right front downmix channel combined with the parametrically decoded right channel. The left surround channel output of the decoder would be just the left surround parametrically decoded signal (i.e., there would be no non-zero low frequency left surround channel content). Similarly, the right surround channel output of the decoder would be just the right surround parametrically decoded signal (i.e., there would be no non-zero low frequency right surround channel content).

In some alternative embodiments, the inventive decoding method includes steps of (and the inventive decoding system is configured to perform) recovery of each channel of a waveform encoded downmix of low frequency components of the audio content of channels (some or all of the channels) of an original multi-channel input signal, and blind upmixing (i.e., "blind" in the sense of being performed not in response to any parametric data received from an encoder) on a waveform decoded version of each downmix channel of low frequency components of the downmix, followed by recombination of each channel of the upmixed low frequency components with a corresponding channel of parametrically decoded intermediate and high frequency content recovered from the encoded signal. Blind upmixers are well known in the art, and an example of blind upmixing is described in U.S. Patent Application Publication No. 2011/0274280 A1, published on Nov. 10, 2011. No specific blind upmixer is required by the invention, and different blind upmixing methods may be employed to implement different embodiments of the invention. For example, consider an embodiment which receives and decodes an encoded audio signal including a 3-channel downmix (comprising Left Front, Center, and Right Front channels) of the low frequency components of a five-channel input signal (comprising Left Front, Left Surround, Center, Right Surround, and Right Front channels). In this embodiment, the decoder includes a blind upmixer (e.g., implemented in the frequency domain by stage 40 of FIG. 3) configured to perform blind upmixing on a waveform decoded version of each downmix channel (left front, center, and right front) of low frequency components of the 3-channel downmix. The decoder is also configured to combine (e.g., stage 40 of FIG. 3 is configured to combine) the left front output channel (comprising low frequency components) of the decoder's blind upmixer with the parametrically decoded left front channel (comprising intermediate and high frequency components) of the encoded audio signal received by the decoder, the left surround output channel of the blind upmixer (comprising low frequency components) with the parametrically decoded left surround channel (comprising intermediate and high frequency components) of the audio signal received by the decoder, the center output channel of the blind upmixer (comprising low frequency components) with the parametrically decoded center channel (comprising intermediate and high frequency components) of the audio signal received by the decoder, the right front output channel of the blind upmixer (comprising low frequency components) with the parametrically decoded right front channel (comprising intermediate and high frequency components) of the audio signal, and the right surround output of the blind upmixer with the parametrically decoded right surround channel of the audio signal received by the decoder.

In a typical embodiment of the inventive decoder, recombination of decoded low frequency content of an encoded audio signal with parametrically decoded intermediate and high frequency content of the signal is performed in the frequency domain (e.g., in stage 40 of the FIG. 3 decoder) and then a single frequency domain to time domain transform is applied to each recombined channel (e.g., in stage 40 of the FIG. 3 decoder) to generate the fully decoded time domain signal. Alternatively, the inventive decoder is configured to perform such recombination in the time domain by inverse transforming the waveform decoded low frequency components using a first transform, inverse transforming the parametrically decoded intermediate and high frequency components using a second transform, and then summing the results.

In an exemplary embodiment of the invention, the FIG. 2 system is operable to perform E-AC-3 encoding of a 5.1 channel audio input signal indicative of audience applause, in a manner assuming an available bitrate (for transmission of the encoded output signal) in a range from 192 kbps down to a bitrate substantially less than 192 kbps (e.g., 96 kbps). The following exemplary bit cost calculations assume that such a system is operated to encode a multichannel input signal which is indicative of audience applause and has five full range channels, and that the frequency components of each full range channel of the input signal have at least substantially the same distribution as a function of frequency. The exemplary bit cost calculations also assume that the system performs E-AC-3 encoding the input signal, including by performing waveform encoding on frequency components having frequency up to 4.6 kHz of each full range channel of the input signal, channel coupling coding on frequency components from 4.6 kHz to 10.2 kHz of each full range channel of the input signal, and spectral extension coding on frequency components from 10.2 kHz to 14.8 kHz of each full range channel of the input signal. It is assumed that the coupling parameters (coupling sidechain metadata) included in the encoded output signal consume about 1.5 kbps per full range channel, and that the coupling channel's mantissas and exponents consume approximately 25 kbps (i.e., about ⅕ as many bits as transmitting the individual full range channels would consume, assuming transmission of the encoded output signal at a bitrate of 192 kbps). The bit savings resulting from performing channel coupling is due to transmission of a single channel (coupling channel) of mantissas and exponents rather than five channels of mantissas and exponents (for frequency components in the relevant range).

Thus, if the system were to downmix all audio content from 5.1 to stereo before encoding all frequency components of the downmix (using waveform encoding on frequency components up to 4.6 kHz, channel coupling coding on frequency components from 4.6 kHz to 10.2 kHz, and spectral extension coding on frequency components from 10.2 kHz to 14.8 kHz of each full range channel of the downmix), the coupled channel would still need to consume about 25 kbps to achieve broadcast quality. Thus bit savings (for implementing channel coupling) resulting from the downmix would be due only to omission of coupling parameters for the three channels that no longer require coupling parameters, which amounts to about 1.5 kbps per each of the three channels, or about 4.5 kbps in total. Thus, the cost of performing channel coupling on the stereo downmix is almost the same (only about 4.5 kbps less) than for performing channel coupling on the original five full range channels of the input signal.

Performing spectral extension coding on all five full range channels of the exemplary input signal would require inclusion of spectral extension ("SPX") parameters (SPX sidechain metadata) in the encoded output signal. This would require inclusion in the encoded output signal about 3 kbps of SPX metadata per full range channel (a total of about 15 kbps for all five full range channels), still assuming transmission of the encoded output signal at a bitrate of 192 kbps.

Thus, if the system were to downmix the five full range channels of the input signal to two channels (a stereo downmix) before encoding all frequency components of the downmix (using waveform encoding on frequency components up to 4.6 kHz, channel coupling coding on frequency components from 4.6 kHz to 10.2 kHz, and spectral extension coding on frequency components from 10.2 kHz to 14.8 kHz of each full range channel of the downmix), the bit savings (for implementing spectral extension coupling) resulting from the downmix would be due only to omission of SPX parameters for the three channels that no longer require such parameters, which amounts to about 3 kbps per each of the three channels, or about 9 kbps in total.

The cost of coupling and spx coding in the example is summarized below in Table 1.

TABLE 1

(cost of coupling & spectral extension coding for 5, 3, and 2 channels)

| Portion | Cost for 5.1 ch input audio at 192 kbps | Estimated cost for similar quality when encoding 3/0 downmix | Estimated cost for similar quality when encoding 2/0 downmix |
|---|---|---|---|
| Coupling Channel Exponents | 5 | 5 | 5 |
| Coupling Channel Mantissas | 20 | 20 | 20 |
| Coupling metadata | 7.5 | 4.5 | 3 |
| SPX metadata | 15 | 9 | 6 |
| Total | 47.5 kbps | 38.5 kbps | 34 kbps |
| Downmix Savings vs 5 ch | n/a | 9 kbps | 13.5 kbps |

It is apparent from Table 1 that a full downmix of the 5.1 channel input signal input to a 3/0 downmix (three full range channels) prior to encoding saves only 9 kbps (in the coupling and spectral extension frequency bands), and a full downmix of the 5.1 channel input signal input to a 2/0 downmix (two full range channels) prior to encoding saves only 13.5 kbps in the coupling and spectral extension frequency bands. Of course, each such downmix would also reduce the number of bits required for waveform encoding of the low frequency components (having frequency below the minimum frequency for channel coding) of the downmix, but at a cost of spatial collapse.

The inventors have recognized that since the bit cost of performing coupling coding and spectral extension coding of multiple channels (e.g., five, three, or two channels as in the above example) is so similar, it is desirable to code as many channels of a multi-channel audio signal as possible with parametric coding (e.g., coupling coding and spectral extension coding as in the above example). Thus, typical embodiments of the invention downmix only the low frequency components (below the minimum frequency for channel coding) of channels (i.e., some or all of the channels) of a multichannel input signal to be encoded, and perform waveform encoding on each channel of the downmix, and also perform parametric coding (e.g., coupling coding and spectral extension coding) on the higher frequency components (above the minimum frequency for parametric coding) of each original channel of the input signal. This saves a large number of bits by removing discrete channel exponents and mantissas from the encoded output signal, while minimizing spatial collapse thanks to including a parametrically coded version of the high frequency content of all original channels of the input signal.

A comparison of the bit cost and savings resulting from two embodiments of the invention, relative to the conventional method of performing E-AC-3 encoding of the 5.1 channel signal described with reference to the above example is as follows:

The total cost of conventional E-AC-3 encoding of the 5.1 channel signal is 172.5 kbps, which is the 47.5 kbps summarized in the left column of Table 1 (for parametric coding of the high frequency content, above 4.6 kHz, of the input signal), plus 25 kbps for five channels of exponents (resulting from waveform encoding of the low frequency content, below 4.6 kHz, of each channel of the input signal), plus 100 kbps for five channels of mantissas (resulting from waveform encoding of the low frequency content of each channel of the input signal).

The total cost of encoding of the 5.1 channel input signal in accordance with an embodiment of the invention in which a 3-channel downmix of the low frequency components (below 4.6 kHz) of the five full range channels of the input signal is generated, and in which an E-AC-3 compliant encoded output signal is generated (including by waveform encoding the downmix, and parametrically encoding the high frequency components of each original full range channel of the input signal) is 122.5 kbps, which is the 47.5 kbps summarized in the left column of Table 1 (for parametric coding of the high frequency content, above 4.6 kHz, of each channel of the input signal), plus 15 kbps for three channels of exponents (resulting from waveform encoding of the low frequency content of each channel of the downmix), plus 60 kbps for three channels of mantissas (resulting from waveform encoding of the low frequency content of each channel of the downmix). This represents a savings of 50 kbps relative to the conventional method. This savings allows for transmission of the encoded output signal (with equivalent quality to that of the conventionally encoded output signal) at a bit rate of 142 kbps, rather than the 192 kbps which would be required for transmission of the conventionally encoded output signal.

It is expected that an actual implementation of the inventive method described in the previous paragraph, parametric encoding of the high frequency (above 4.6 kHz) content of the input signal would require somewhat less than the 7.5 kbps indicated in Table 1 for coupling parameter metadata and the 15 kbps indicated in Table 1 for SPX parameter metadata, due to maximal timesharing of the zero-value data in the silent channels. Thus, such an actual implementation would provide a savings of somewhat more than 50 kbps relative to the conventional method.

Similarly, the total cost of encoding of the 5.1 channel signal in accordance with an embodiment of the invention in which a 2-channel downmix of the low frequency components (below 4.6 kHz) of the five full range channels of the input signal is generated, and in which an E-AC-3 compliant encoded output signal is then generated (including by waveform encoding the downmix, and parametrically encoding the high frequency components of each original full range channel of the input signal) is 102.5 kbps, which is the 47.5 kbps summarized in the left column of Table 1 (for parametric coding of the high frequency content, above 4.6 kHz, of the input signal), plus 10 kbps for two channels of exponents (resulting from waveform encoding of the low frequency content of each channel of the downmix), plus 45 kbps for two channels of mantissas (resulting from waveform encoding of the low frequency content of each channel of the downmix). This represents a savings of 70 kbps relative to the conventional method. This savings allows for transmission of the encoded output signal (with equivalent quality to that of the conventionally encoded output signal) at a bit rate of 122 kbps, rather than the 192 kbps which would be required for transmission of the conventionally encoded output signal. It is expected that an actual implementation of the inventive method described in the previous paragraph, parametric encoding of the high frequency (above 4.6 kHz) content of the input signal would require somewhat less than the 7.5 kbps indicated in Table 1 for coupling parameter metadata and the 15 kbps indicated in Table 1 for SPX parameter metadata, due to maximal timesharing of the zero-value data in the silent channels. Thus, such an actual implementation would provide a savings of somewhat more than 70 kbps relative to the conventional method.

In some embodiments, the inventive encoding method implements "enhanced coupling" coding in the sense that the low frequency components that are downmixed and then undergo waveform encoding have a reduced (lower than typical) maximum frequency (e.g., 1.2 kHz, rather than the typical minimum frequency (3.5 kHz or 4.6 kHz, in conventional E-AC-3 encoders) above which channel coupling is performed and below which waveform encoding is performed on input audio content. In such embodiments, frequency components of input audio in a wider than typical frequency range (e.g., from 1.2 kHz to 10 kHz, or from 1.2 kHz to 10.2 kHz) undergo channel coupling coding. Also in such embodiments, the coupling parameters (level parameters) that are included in the encoded output signal with the encoded audio content resulting from the channel encoding may be quantized differently (in a manner that will be apparent to those of ordinary skill in the art) than they would if only frequency components in a typical (narrower) range undergo channel coupling coding.

Embodiments of the invention which implement enhanced coupling coding may be desirable since they will typically deliver zero-value exponents (in the encoded output signal) for frequency components having frequency less than the minimum frequency for channel coupling coding, and reducing this minimum frequency (by implementing enhanced coupling coding) thus reduces the overall number of wasted bits (zero bits) included in the encoded output signal and provides increased spaciousness (when the encoded signal is decoded and rendered), with only a slight increase in bit rate cost.

As noted above, in some embodiments of the invention, low frequency components of a first subset of the channels of the input signal (e.g., the L, C, and R channels as indicated in FIG. 2) are selected as a downmix which undergoes waveform encoding, and the low frequency components of each channel of a second subset of the input signal's channels (typically the surround channels, e.g., the Ls and Rs channels as indicated in FIG. 2) are set to zero (and may also undergo waveform encoding). In some such embodiments, in which the encoded audio signal generated in accordance with the invention is compliant with the E-AC-3 standard, even though only the low frequency audio content of the first subset of channels of the E-AC-3 encoded signal is useful, waveform encoded, low frequency audio content (and the low frequency audio content of the second subset of channels of the E-AC-3 encoded signal is useless, waveform encoded, "silent" audio content), the full set of channels (both the first and second subset) must be formatted and delivered as an E-AC-3 signal. For example, left and right surround channels will be present in the E-AC-3 encoded signal but their low frequency content will be silence, which requires some overhead to transmit. The "silent" channels (corresponding to the above-noted second subset of channels) may be configured in accordance with the following guidelines to minimize such overhead.

Block switches would conventionally appear on channels of an E-AC-3 encoded signal which are indicative of transient signals, and these block switches would result in splitting (in an E-AC-3 decoder) of MDCT blocks of waveform encoded content of such a channel into a greater number of smaller blocks (which then undergo waveform decoding), and would disable parametric (channel coupling and spectral extension) decoding of high frequency content of such a channel. Signaling of a block switch in a silent channel (a channel including "silent" low frequency content) would require more overhead and would also prevent parametric decoding of high frequency content (having frequency above the minimum "channel coupling decoding" frequency) of the silent channel. Thus, block switches for each silent channel of an E-AC-3 encoded signal generated in accordance with typical embodiments of the present invention should be disabled.

Similarly, conventional AHT and TPNP processing (sometimes performed in operation of a conventional E-AC-3 decoder) offer no benefit during decoding of a silent channel of an E-AC-3 encoded signal generated in accordance with an embodiment of the present invention. Thus, AHT and TPNP processing is preferably disabled during decoding of each silent channel of such an E-AC-3 encoded signal.

The dithflag parameter conventionally included in a channel of an E-AC-3 encoded signal indicates to an E-AC-3 decoder whether to reconstruct mantissas (in the channel) which were allocated zero bits by the encoder with random noise. Since each silent channel of an E-AC-3 encoded signal generated in accordance with an embodiment is intended to be truly silent, the dithflag for each such silent channel should be set to zero during generation of the E-AC-3 encoded signal. As a result, mantissas (in each such silent channel) which are allocated zero bits will not be reconstructed using noise during decoding.

The exponent strategy parameter conventionally included in a channel of an E-AC-3 encoded signal is used by an E-AC-3 decoder to control the time and frequency resolution of the exponents in the channel. For each silent channel of an E-AC-3 encoded signal generated in accordance with an embodiment, the exponent strategy which minimizes the transmission cost for the exponents is preferably selected. The exponent strategy which accomplishes this is known as the "D45" strategy, and it includes one exponent per four frequency bins for the first block of an encoded frame (the remaining blocks of the frame reuse the exponents for the previous block).

One issue with some embodiments of the inventive encoding method which are implemented in the frequency domain is that the downmix (of low frequency content of input signal channels) could saturate when transformed back into the time domain, and there is no way to predict when this will happen using purely frequency-domain analysis. This issue is addressed in some such embodiments (e.g., some which implement E-AC-3 encoding) by simulating the downmix in the time domain (before actually generating it in the frequency domain) to evaluate whether clipping will occur. A traditional peak limiter can be used to calculate scale factors, which are then applied to all destination channels in the downmix Only downmixed channels are attenuated by the clipping prevention scale factors. For example, in a downmix in which content of Left and Left Surround channels of the input signal are downmixed to a left downmix channel, and content of Right and Right Surround channels of the input signal are downmixed to a right downmix channel, the Center channel would not be scaled since it is not a source or destination channel in the downmix. After such downmix clipping protection has been applied, its effect could be compensated for by applying conventional E-AC-3 DRC/downmix protection.

Figure 1:
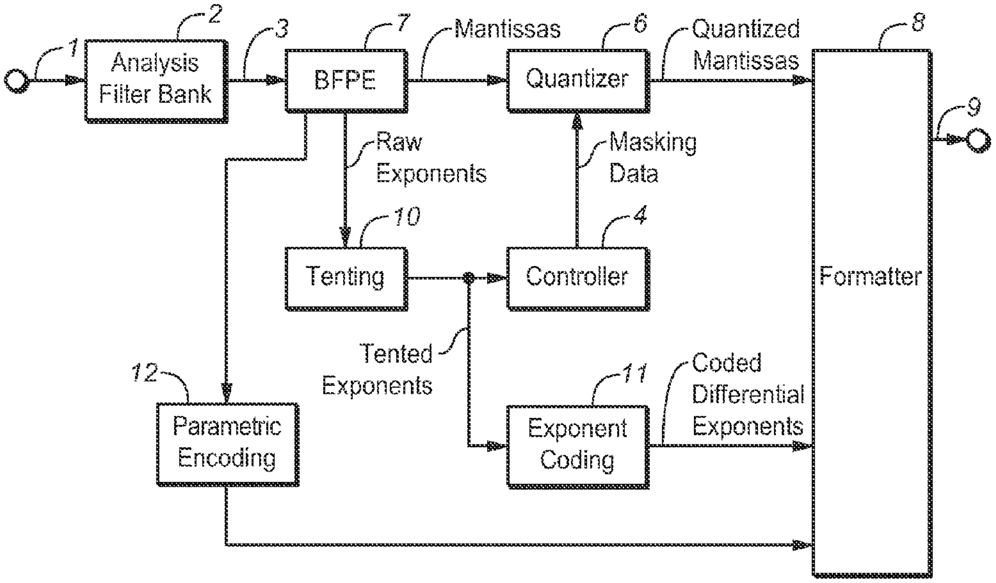
FIG. 1 (PRIOR ART)
FIG. 1 is a block diagram of a conventional encoding system.
Figure 4:
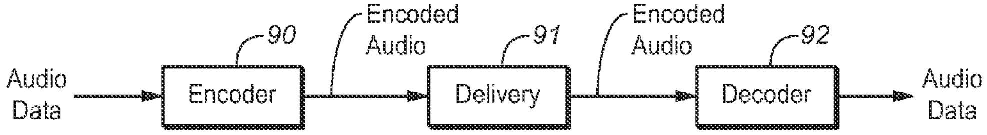
FIG. 4 is a block diagram of a system including an encoder configured to perform any embodiment of the inventive encoding method to generate encoded audio data in response to audio data, and a decoder configured to decode the encoded audio data to recover the audio data.

Other aspects of the invention include an encoder configured to perform any embodiment of the inventive encoding method to generate an encoded audio signal in response to a multichannel audio input signal (e.g., in response to audio data indicative of a multichannel audio input signal), a decoder configured to decode such an encoded signal, and a system including such an encoder and such a decoder. The FIG. 4 system is an example of such a system. The system of FIG. 4 includes encoder 90, which is configured (e.g., programmed) to perform any embodiment of the inventive encoding method to generate an encoded audio signal in response to audio data (indicative of a multi-channel audio input signal), delivery subsystem 91, and decoder 92. Delivery subsystem 91 is configured to store the encoded audio signal (e.g., to store data indicative of the encoded audio signal) generated by encoder 90 and/or to transmit the encoded audio signal. Decoder 92 is coupled and configured (e.g., programmed) to receive the encoded audio signal (or data indicative of the encoded audio signal) from subsystem 91 (e.g., by reading or retrieving such data from storage in subsystem 91, or receiving such encoded audio signal that has been transmitted by subsystem 91), and to decode the encoded audio signal (or data indicative thereof). Decoder 92 is typically configured to generate and output (e.g., to a rendering system) a decoded audio signal indicative of audio content of the original multi-channel input signal.

In some embodiments, the invention is an audio encoder configured to generate an encoded audio signal by encoding a multichannel audio input signal. The encoder includes:

an encoding subsystem (e.g., elements 22, 23, 24, 26, 27, and 28 of FIG. 2) configured to generate a downmix of low frequency components of at least some channels of the input signal, to waveform code each channel of the downmix, thereby generating waveform coded, downmixed data indicative of audio content of the downmix, and to perform parametric encoding on intermediate frequency components and high frequency components of each channel of the input signal, thereby generating parametrically coded data indicative of the intermediate frequency components and the high frequency components of said each channel of the input signal; and a formatting subsystem (e.g., element 30 of FIG. 2) coupled and configured to generate the encoded audio signal in response to the waveform coded, downmixed data and the parametrically coded data, such that the encoded audio signal is indicative of said waveform coded, downmixed data and said parametrically coded data.

In some such embodiments, the encoding subsystem is configured to perform (e.g., in element 22 of FIG. 2) a time domain-to-frequency domain transform on the input signal to generate frequency domain data including the low frequency components of at least some channels of the input signal and the intermediate frequency components and the high frequency components of said each channel of the input signal.

In some embodiments, the invention is an audio decoder configured to decode an encoded audio signal (e.g., signal 31 of FIG. 2 or FIG. 3) indicative of waveform coded data and parametrically coded data, where the encoded audio signal has been generated by generating a downmix of low frequency components of at least some channels of a multichannel audio input signal having N channels, where N is an integer, waveform coding each channel of the downmix, thereby generating the waveform coded data such that said waveform coded data are indicative of audio content of the downmix, performing parametric encoding on intermediate frequency components and high frequency components of each channel of the input signal, thereby generating the parametrically coded data such that said parametrically coded data are indicative of the intermediate frequency components and the high frequency components of said each channel of the input signal, and generating the encoded audio signal in response to the waveform coded data and the parametrically coded data. In these embodiments, the decoder includes:

a first subsystem (e.g., element 32 of FIG. 3) configured to extract the waveform encoded data and the parametrically encoded data from the encoded audio signal; and a second subsystem (e.g., elements 34, 36, 37, 38, and 40 of FIG. 3) coupled and configured to perform waveform decoding on the waveform encoded data extracted by the first subsystem to generate a first set of recovered frequency components indicative of low frequency audio content of each channel of the downmix, and to perform parametric decoding on the parametrically encoded data extracted by the first subsystem to generate a second set of recovered frequency components indicative of intermediate frequency and high frequency audio content of each channel of the multichannel audio input signal.

In some such embodiments, the decoder's second subsystem is also configured to generate N channels of decoded frequency-domain data including by combining (e.g., in element 40 of FIG. 3) the first set of recovered frequency components and the second set of recovered frequency components, such that each channel of the decoded frequency-domain data is indicative of intermediate frequency and high frequency audio content of a different one of the channels of the multichannel audio input signal, and each of at least a subset of the channels of the decoded frequency-domain data is indicative of low frequency audio content of the multichannel audio input signal.

In some embodiments, the decoder's second subsystem is configured to perform (e.g., in element 40 of FIG. 3) a frequency domain-to-time domain transform on each of the channels of decoded frequency-domain data to generate an N-channel, time-domain decoded audio signal.

Another aspect of the invention is a method (e.g., a method performed by decoder 92 of FIG. 4 or the decoder of FIG. 3) for decoding an encoded audio signal which has been generated in accordance with an embodiment of the inventive encoding method.

The invention may be implemented in hardware, firmware, or software, or a combination of both (e.g., as a programmable logic array). Unless otherwise specified, the algorithms or processes included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems (e.g., a computer system which implements the encoder of FIG. 2 or the decoder of FIG. 3), each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

For example, when implemented by computer software instruction sequences, various functions and steps of embodiments of the invention may be implemented by multithreaded software instruction sequences running in suitable digital signal processing hardware, in which case the various devices, steps, and functions of the embodiments may correspond to portions of the software instructions.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be implemented as a computer-readable storage medium, configured with (i.e., storing) a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. Numerous modifications and variations of the present invention are possible in light of the above teachings. It is to be understood that within the scope of the appended claims, the invention may be practiced otherwise than as specifically described herein.

What is claimed is:

1. A method for encoding a multichannel audio input signal having low frequency components and higher frequency components, said method including the steps of:

(a) generating a downmix of the low frequency components of at least some channels of the input signal;

(b) waveform coding each channel of the downmix, thereby generating waveform coded, downmixed data indicative of audio content of the downmix;

(c) performing parametric encoding on at least some of the higher frequency components of each channel of the input signal, thereby generating parametrically coded data indicative of said at least some of the higher frequency components of said each channel of the input signal; and (d) generating an encoded audio signal indicative of the waveform coded, downmixed data and the parametrically coded data.

2. The method of claim 1, wherein the encoded audio signal is an E-AC-3 encoded audio signal.

3. The method of claim 1, wherein the higher frequency components include intermediate frequency components and high frequency components, and wherein step (c) includes steps of:

performing channel coupling coding of the intermediate frequency components; and performing spectral extension coding of the high frequency components.

4. The method of claim 3, wherein the low frequency components have frequencies not greater than a maximum value, F1, in a range from about 1.2 kHz to about 4.6 kHz, the intermediate frequency components have frequencies, f, in the range F1<f≤F2, where F2 is in a range from about 8 kHz to about 12.5 kHz, and the high frequency components have frequencies, f, in the range F2<f≤F3, where F3 is in the range from about 10.2 kHz to about 18 kHz.

5. The method of claim 4, wherein the encoded audio signal is an E-AC-3 encoded audio signal.

6. The method of claim 1, wherein the input signal has a number, N, of full range audio channels, the downmix has fewer than N nonsilent channels, and step (a) includes a step of replacing the low frequency components of at least one of the full range audio channels of the input signal with zero values.

7. The method of claim 1, wherein the input signal has five full range audio channels, the downmix has three nonsilent channels, and step (a) includes a step of replacing the low frequency components of two of the full range audio channels of the input signal with zero values.

8. The method of claim 1, wherein the encoding compresses the input signal such that the encoded audio signal comprises fewer bits than does said input signal.

9. An audio encoder configured to generate an encoded audio signal by encoding a multichannel audio input signal having low frequency components and higher frequency components, said encoder including:

an encoding subsystem configured to generate a downmix of the low frequency components of at least some channels of the input signal, to waveform code each channel of the downmix, thereby generating waveform coded, downmixed data indicative of audio content of the downmix, and to perform parametric encoding on at least some of the higher frequency components of each channel of the input signal, thereby generating parametrically coded data indicative of said at least some of the higher frequency components of said each channel of the input signal; and a formatting subsystem coupled and configured to generate the encoded audio signal in response to the waveform coded, downmixed data and the parametrically coded data, such that the encoded audio signal is indicative of said waveform coded, downmixed data and said parametrically coded data.

10. The encoder of claim 9, wherein the encoding subsystem is configured to perform a time domain-to-frequency domain transform on the input signal to generate frequency domain data including the low frequency components of at least some channels of the input signal and the higher frequency components of said each channel of the input signal.

11. The encoder of claim 9, wherein the higher frequency components include intermediate frequency components and high frequency components, and the encoding subsystem is configured to generate the parametrically coded data by performing channel coupling coding of the intermediate frequency components and spectral extension coding of the high frequency components.

12. The encoder of claim 11, wherein the low frequency components have frequencies not greater than a maximum value, F1, in a range from about 1.2 kHz to about 4.6 kHz, the intermediate frequency components have frequencies, f, in the range F1<f≤F2, where F2 is in a range from about 8 kHz to about 12.5 kHz, and the high frequency components have frequencies, f, in the range F2<f≤F3, where F3 is in the range from about 10.2 kHz to about 18 kHz.

13. The encoder of claim 12, wherein the encoded audio signal is an E-AC-3 encoded audio signal.

14. The encoder of claim 9, wherein the input signal has at least two full range audio channels, and encoding subsystem is configured to generate the downmix by replacing the low frequency components of at least one of the full range audio channels of the input signal with zero values.

15. The encoder of claim 9, wherein said encoder is configured to generate the encoded audio signal such that said encoded audio signal comprises fewer bits than does the input signal.

16. The encoder of claim 9, wherein the encoded audio signal is an E-AC-3 encoded audio signal.

17. The encoder of claim 9, wherein said encoder is a digital signal processor.

18. A method for decoding an encoded audio signal indicative of waveform coded data and parametrically coded data, where the encoded audio signal has been generated by generating a downmix of low frequency components of at least some channels of a multichannel audio input signal, waveform coding each channel of the downmix, thereby generating the waveform coded data such that said waveform coded data are indicative of audio content of the downmix, performing parametric encoding on at least some higher frequency components of each channel of the input signal, thereby generating the parametrically coded data such that said parametrically coded data are indicative of said at least some higher frequency components of said each channel of the input signal, and generating the encoded audio signal in response to the waveform coded data and the parametrically coded data, said method including the steps of:

(a) extracting the waveform encoded data and the parametrically encoded data from the encoded audio signal;

(b) performing waveform decoding on the waveform encoded data extracted in step (a) to generate a first set of recovered frequency components indicative of low frequency audio content of each channel of the downmix; and (c) performing parametric decoding on the parametrically encoded data extracted in step (a) to generate a second set of recovered frequency components indicative of at least some higher frequency audio content of each channel of the multichannel audio input signal.

19. The method of claim 18, wherein the multichannel audio input signal has N channels, where N is an integer, and wherein said method also includes a step of:

(d) generating N channels of decoded frequency-domain data including by combining said first set of recovered frequency components and said second set of recovered frequency components, such that each channel of the decoded frequency-domain data is indicative of intermediate frequency and high frequency audio content of a different one of the channels of the multichannel audio input signal, and each of at least a subset of the channels of the decoded frequency-domain data is indicative of low frequency audio content of the multichannel audio input signal.

20. The method of claim 19, also including a step of performing a frequency domain-to-time domain transform on each of the channels of decoded frequency-domain data to generate an N-channel, time-domain decoded audio signal.

21. The method of claim 18, wherein the encoded audio signal is an E-AC-3 encoded audio signal.

22. The method of claim 18, wherein step (c) includes steps of:

performing channel coupling decoding on at least some of the parametrically encoded data extracted in step (a); and performing spectral extension decoding on at least some of the parametrically encoded data extracted in step (a).

23. The method of claim 18, wherein the first set of recovered frequency components have frequencies less than or equal to a maximum value, F1, in a range from about 1.2 kHz to about 4.6 kHz.

24. An audio decoder configured to decode an encoded audio signal indicative of waveform coded data and parametrically coded data, where the encoded audio signal has been generated by generating a downmix of low frequency components of at least some channels of a multichannel audio input signal having N channels, where N is an integer, waveform coding each channel of the downmix, thereby generating the waveform coded data such that said waveform coded data are indicative of audio content of the downmix, performing parametric encoding on at least some higher frequency components of each channel of the input signal, thereby generating the parametrically coded data such that said parametrically coded data are indicative of said at least some higher frequency components of said each channel of the input signal, and generating the encoded audio signal in response to the waveform coded data and the parametrically coded data, said decoder including:

a first subsystem configured to extract the waveform encoded data and the parametrically encoded data from the encoded audio signal; and a second subsystem coupled and configured to perform waveform decoding on the waveform encoded data extracted by the first subsystem to generate a first set of recovered frequency components indicative of low frequency audio content of each channel of the downmix, and to perform parametric decoding on the parametrically encoded data extracted by the first subsystem to generate a second set of recovered frequency components indicative of at least some higher frequency audio content of each channel of the multichannel audio input signal.

25. The decoder of claim 24, wherein the second subsystem is also configured to generate N channels of decoded frequency-domain data including by combining said first set of recovered frequency components and said second set of recovered frequency components, such that each channel of the decoded frequency-domain data is indicative of intermediate frequency and high frequency audio content of a different one of the channels of the multichannel audio input signal, and each of at least a subset of the channels of the decoded frequency-domain data is indicative of low frequency audio content of the multichannel audio input signal.

26. The decoder of claim 25, wherein the second subsystem is configured to perform a frequency domain-to-time domain transform on each of the channels of decoded frequency-domain data to generate an N-channel, time-domain decoded audio signal.

27. The decoder of claim 24, wherein the encoded audio signal is an E-AC-3 encoded audio signal.

28. The decoder of claim 24, wherein the second subsystem is configured to perform channel coupling decoding on at least some of the parametrically encoded data extracted by the first subsystem, and to perform spectral extension decoding on at least some of the parametrically encoded data extracted by the first subsystem.

29. The decoder of claim 24, wherein the first set of recovered frequency components have frequencies less than or equal to a maximum value, F1, in a range from about 1.2 kHz to about 4.6 kHz.

30. The decoder of claim 24, wherein said decoder is a digital signal processor.

* * * * *